April 30, 1929.   J. C. SHAW   1,711,290
ELECTRIC TRACER CONTROL FOR LATHES
Original Filed Dec. 26, 1924   3 Sheets-Sheet 1
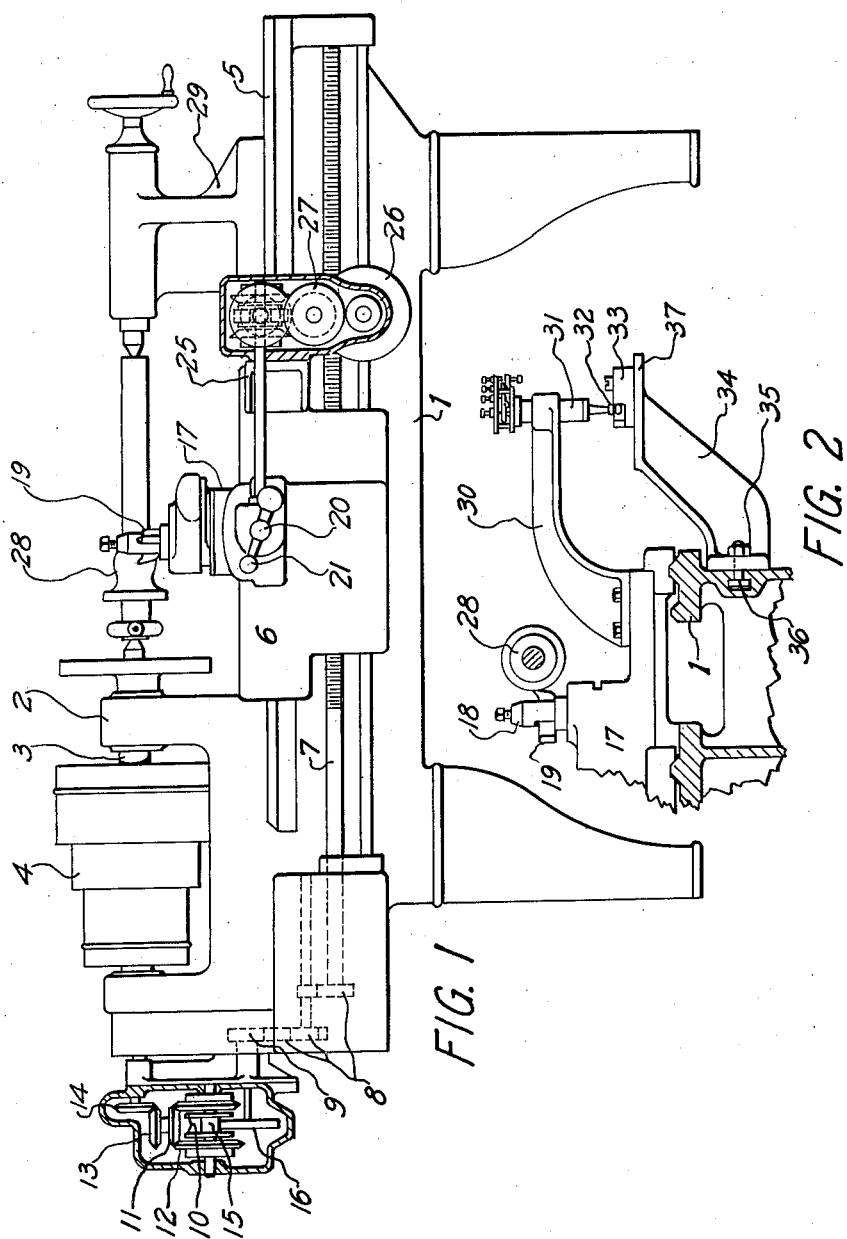
INVENTOR.
John C. Shaw
BY
ATTORNEYS.

April 30, 1929.  J. C. SHAW  1,711,290
ELECTRIC TRACER CONTROL FOR LATHES
Original Filed Dec. 26, 1924   3 Sheets-Sheet 2

John C. Shaw INVENTOR.

BY
ATTORNEY.

Patented Apr. 30, 1929.

1,711,290

UNITED STATES PATENT OFFICE.

JOHN C. SHAW, OF BROOKLYN, NEW YORK, ASSIGNOR TO KELLER MECHANICAL ENGINEERING CORPORATION, OF BROOKLYN, NEW YORK, A CORPORATION OF NEW YORK.

ELECTRIC-TRACER CONTROL FOR LATHES.

Application filed December 26, 1924, Serial No. 758,110. Renewed September 7, 1928.

My improvement relates more particularly to the control of the feed of the lathe cutting tool relative to the work, such control being particularly desirable in the duplication of work. Therefore, by means of my improved electrical tracer cooperating with a fixed pattern, the control of the feed of the cutting tool of the lathe, is regulated and controlled, as the tracer follows the pattern, to reproduce the outline of the pattern in the turned work.

In my Patent, No. 1,506,454, of August 26, 1924, my electric tracer for controlling die sinking machines is more particularly described and illustrated, and further improvements and adaptations of the electric tracer control and the operation of the magnetic clutches is shown and described in my pending application, Ser. No. 696,827, filed March 4, 1924, for electrical operation and control of machine tools.

The object of my present improvement is the adaptation of electric tracer control to the duplication of work on a lathe, which has been arranged for and equipped with the necessary magnetic clutch drives for controlling the feed of the lathe tool, by means of my improved electric tracer.

Figure 3:
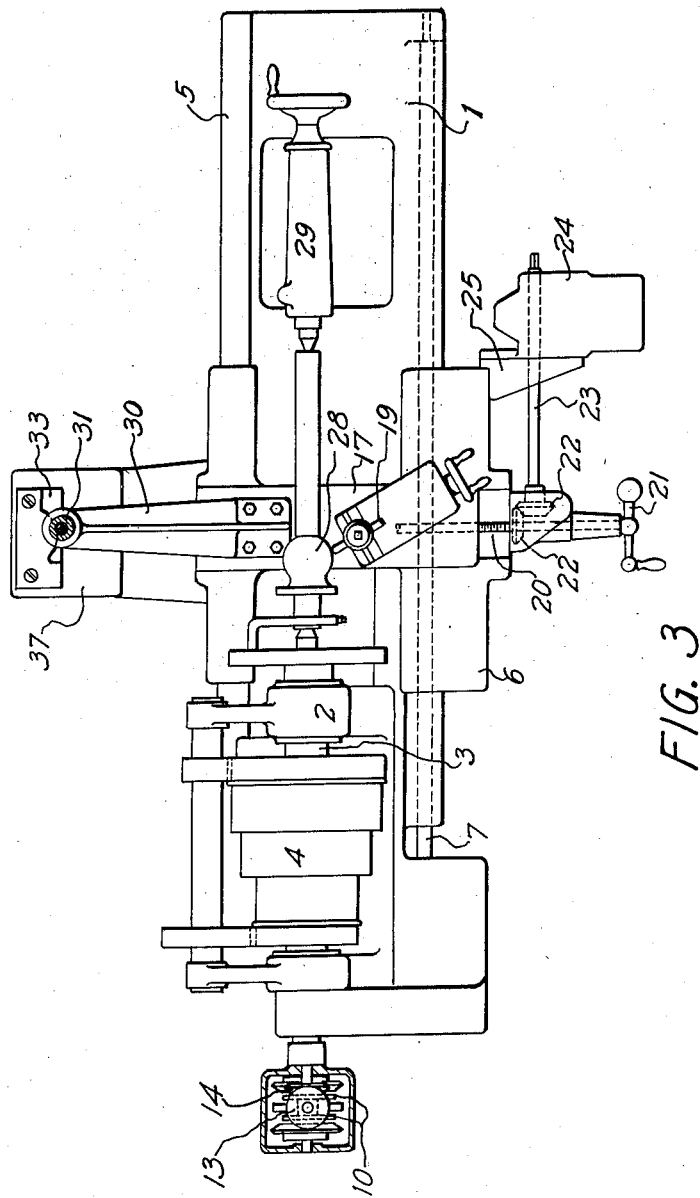
Figure 4:
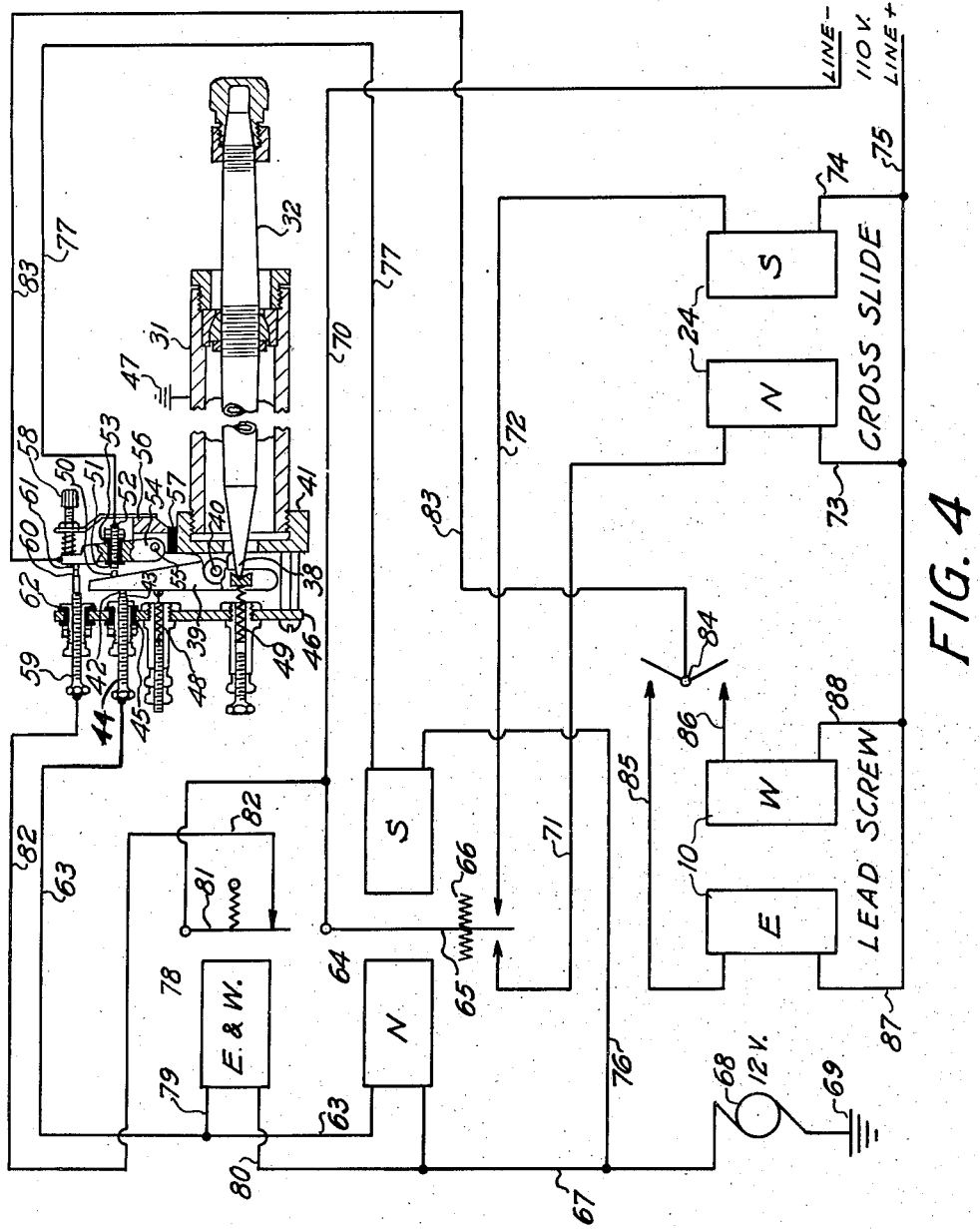

It will be understood that in adapting my improved electric tracer control to the lathe, many of the automatic and special control features shown and described in my pending application, above referred to, might be incorporated, but since the turning of an object or the work in a lathe is entirely different from the character of work contemplated by the machine of said application, only the essential features of the electrical tracer control are ordinarily required. Therefore, in the accompanying drawings, one adaptation of my electric tracer control to the lathe is shown, in which Fig. 1 is a side elevation of an ordinary screw feed machine lathe, provided with my improved electric tracer control; Fig. 2 is a fragmentary cross section, showing the mounting of the tracer and pattern supporting table; Fig. 3 is a plan view of the lathe shown in Fig. 1, with the tracer control elements and Fig. 4 is a wiring diagram showing the electrical connections of the relays, magnetic clutches and tracers.

Referring to the drawings, the lathe comprises the usual bed 1, having the head stock 2, in which there is mounted the spindle 3. The spindle 3 may be driven in any suitable manner but it is here shown as adapted to be driven by a belt in the usual manner, the spindle being provided with the stepped pulleys 4, for this purpose. The lathe bed 1 is provided with the usual slide ways at 5, upon which there is mounted the usual longitudinal slide 6, which is adapted to be moved or fed in one direction or the other, by means of the lead screw 7. Instead, however, of the lead screw being connected in the usual manner, the intermediate gears 8 connect it to a shaft 9 which is adapted to be operated by a pair of magnetic clutches 10, substantially as shown and described in my patent and in my pending application, above referred to.

The magnetic clutches 10 may be driven by a separate motor, as hereinafter described for the cross feed lead screw, but preferably they are driven from the lathe spindle 3, as shown in Figs. 1 and 3 of the drawings. A bevel pinion 11, meshing with bevel gears 12 on the respective magnetic clutches 10 will, when power driven, turn the clutches in opposite directions. The pinion 11 is secured to a short shaft carrying a bevel gear 13, which, in turn, meshes with a bevel gear 14, secured to the outer end of the spindle shaft 3, thereby providing for the power drive of the magnetic clutches. A pinion 15, secured to armature discs co-operating with the magnetic clutches, meshes with a spur gear 16, mounted on the shaft 9, which, as previously described, is adapted to drive the lead screw 7 through the intermediate gears 8. It will thus be seen that by simply switching the electric current from one magnetic clutch to the other, the feed of the lead screw can be reversed or by breaking the circuit the feed can be stopped.

The main or longitudinal slide 6 is provided with the usual cross feed slide 17 carrying the tool post 18. The cross feed slide 17 is adapted to be operated so as to move the tool 19 toward and from the work or toward and from the axis of the spindle, and for this purpose there is provided the usual lead screw 20, the outer end of which may be provided with the usual hand wheel or crank 21. The cross feed lead screw 20, however, in my improved lathe is connected by means of bevel gears 22, with a shaft 23 adapted to be driven by a pair of magnetic clutches (N and S in Fig. 4) in the clutch case 24, which as shown in Figs. 1 and 3, is secured by means of a bracket 25 to the main slide 6, so as to travel therewith. The two clutch members in the clutch case 24 are substantially the same as the clutches 10 or those shown in my patent and pending application, hereinbefore referred to. The magnetic clutches in the clutch case 24, however, are driven by a motor 26 (Fig. 1) through suitable intermediate gears 27 and bevel pinion, in the same manner as the clutch members 10. Thus, by energizing one or the other of the pair of magnetic clutches, adapted to be connected with the cross feed lead screw the latter may be turned in one direction or the other, so as to feed the tool toward or from the work 28, which is rotated by the spindle 3, in the usual manner. Obviously, the work or piece to be turned, may be held by the usual chuck or between the head and tail stock centers in the usual manner, as illustrated in Fig. 1 of the drawings. The usual tail stock is represented at 29.

The cross feed slide 17, in the present instance, is preferably provided with an upwardly and rearwardly extending bracket arm 30, the outer end of which is adapted to support an electric tracer 31, the tracer point 32 of which is adapted to cooperate with a pattern 33. The pattern 33 is preferably mounted in fixed relation to the tool and tracer, and for this purpose a bracket 34 is mounted upon the bed 1 of the lathe, preferably by means of bolts 35 engaging a T-slot 36 in the rear wall of the bed, as indicated in Fig. 2 of the drawings. The bracket 34 carries a table or plate 37, upon which the pattern 33 may be clamped or secured in any preferred manner. The T-slot connection of the bracket to the bed of the lathe enables the operator to position the pattern or model longitudinally of the axis of the spindle, so as to bring it in the proper position for cooperation with the tracer, when the lathe tool 19 is properly located with relation to the work mounted in the lathe. Thus it will be seen that by having the tracer follow the pattern by controlling the movements of the respective lead screws through the magnetic clutches, the cross feed slide will be moved in or out and the lathe tool 19 will correspondingly move toward or from the axis of the spindle, and, operating upon the work, will reproduce the form or outline of the pattern, as the work is turned by the spindle, and the main slide is moved parallel to the axis of the spindle.

In my improved electric tracer control for lathes, the electric tracer, in following the pattern, controls the toward and from feed of the lathe tool by controlling the circuits of the magnetic clutches in the clutch case 24. This control of the magnetic clutches through the electric tracer is more particularly shown in and will be better understood from an examination of the wiring diagram of Fig. 4.

The magnetic clutches 10 for operating the main slide lead screw are indicated in the wiring diagram of Fig. 4, at E and W, while the magnetic clutches in the clutch case 24 for operating the cross feed are indicated at N and S. The tracer 31 is indicated more or less diagrammatically in Fig. 4, and is substantially of the same form as shown in my pending application, above referred to, (or my Patent, No. 1,518,114, December 2, 1924), and is a modification of one of the forms of electric tracers shown in my patent, hereinbefore mentioned. The tracer point 32, by means of the cone end 38 of the tracer spindle, is adapted to actuate a contact carrying lever 39 pivoted at 40 to the head 41 of the tracer body. The lever 39 carries a contact 42, cooperating with a fixed contact 43 on the end of an adjusting screw 44, threaded through insulation at 45 in a bracket plate 46, supported on the head 41 of the tracer. The head of the tracer is grounded as indicated at 47, so that an electric circuit may be completed through the contacts 42—43 and the lever 39. A tension spring 48, together with a compression spring 49, is adapted to draw the upper end of the lever outward so as to normally hold the contacts 42—43 closed.

The lever 39 also carries a contact 50 on the opposite side from the contact 42, which is adapted to cooperate with a contact 51 on the end of an adjusting screw 52, threaded in an insulating bushing 53, which is mounted in an auxiliary contact lever 54, pivoted at 55 in a block or bar 56, mounted upon the head 41 of the tracer, but insulated therefrom, as indicated by 57. A compression spring and adjusting screw 58 are provided for thrusting the lever 54 toward the upper end of the lever 39, but the forward movement and hence the normal position of the auxiliary lever 54 is limited by an adjusting screw 59, the end of which carries a contact 60, cooperating with a contact 61, on the upper end of the auxiliary lever 54, as indicated in Fig. 4 of the drawings. The adjustable contact screw 59 passes through a threaded insulating bushing 62, in the bracket plate 46.

It will be seen from the wiring diagram that the normally closed circuit through the contacts 42—43 is completed through a lead wire 63 leading to the pole N, of a double pole single armature lever relay 64, the armature contact lever arm 65 being normally held central by suitable springs 66. The 12 volt circuit through the relay magnets N and S is completed through the lead 67 and a source of current 68, which is grounded at 69. The magnetic clutches are preferably operated on 110 volts and the main line 110 volt circuit is connected through the lead wire 70 with the relay contact lever 65 and is adapted to be completed through the contact leads 71 and 72, which are connected respectively to the cross slide magnetic clutches N and S. The circuits of the cross feed magnetic clutches N and S are completed through leads 73 and 74 to the other side of the 110 volt line 75, as indicated in Fig. 4. The other magnet S of the double pole relay 64 is connected by lead 76 with lead wire 67 to the source of current, and a lead wire 77, is connected through the screw 52 with the contact 51 on the auxiliary lever 54. It will thus be seen that the circuit through the relay magnet S may be completed by closing the contacts 50—51, which will cause the armature contact lever 65 to be thrown over to close the circuit through the lead 72 and energize the magnetic clutch S operating the cross slide. The 110 volt circuit for energizing the magnetic clutch S is completed through the lead 74 to the line 75.

The lead wire 63 also completes a circuit in parallel through the magnet marked "E and W" of the relay 78 by branch lead wires 79 and 80. Thus, when the relay magnet N, controlling the "in" feed of the cross feed slide, is energized, the relay magnet E and W is energized and its armature lever 81 is attracted so as to break the 110 volt circuit in the lead 82 which, as will be seen in Fig. 4, is connected through the screw 59 to the contact 60, which is normally closed on the contact 61. The auxiliary contact lever 54 is connected by lead wire 83, and, through the contact 61, which is normally closed with the contact 60, the circuit of one or the other of the lead screw magnetic clutches E or W, will be closed. A push button or other suitable switch 84 is connected with the lead 83, so as to connect the latter with one or the other of leads 85 and 86. The lead 85, as shown in Fig. 4, being connected with the magnetic clutch E for the main slide lead screw, the circuit being completed through the lead 87 to the 110 volt line wire 75. The lead 86 connects with the other lead screw magnetic clutch W and is connected by lead 88 with the 110 volt line 75. Thus, it will be seen that the feed of the main slide lead screw may be either to the right or to the left according to the way the switch 84 is thrown, and in either case, the circuit through the magnetic clutch E or W may be broken by breaking the contact 60—61 or through the relay 78, by breaking the contact of the armature lever 81, thus stopping the main lead screw feed.

The operation of my improved electric tracer control for lathes should be readily understood from the foregoing, but it may be desirable to describe it more precisely. With the pattern and work in proper position, as indicated in Figs. 2 and 3 of the drawings, the operation of the spindle 3 will drive the clutch members 10, so that when the circuit of one or the other thereof is closed, through the switch 84, the lead screw 7 will be rotated to move the tool 19 parallel to the axis of the spindle. When the lathe is in operation for duplicating work from a pattern, the electric tracer is in normal position, as indicated in Fig. 4, with the contacts 42—43 closed, thereby completing the circuit through the relay magnet N of the relay 64 and also through the magnet E and W of relay 78. The armature lever 65 will be drawn toward the left, so as to complete the circuit through 71 and 73 of the magnetic clutch N for feeding the cross feed slide toward the pattern and work. As soon as the tool 19 engages the work, it will cut in until the tracer point 32 engages the pattern. When this occurs the cone end 38 of the tracer spindle will actuate the contact carrying lever 39 and break the contacts 42—43 and, by so doing, release the armature 81 of the relay 78 and also the armature lever 65 of the relay 64, the latter breaking the circuit through the leads 71—73 of the magnetic clutch N controlling the "in" feed of the cross feed slide. Releasing the armature contact lever 81, closes the circuit through the leads 82 and 83 and through the switch 84 and one or the other of the leads 85—86, so that one of the clutch magnets 10 is placed in operation to move the tool parallel with the axis of the spindle. The tool will, thereafter continue to cut longitudinally so long as the tracer is not subjected to an excessive increase of pressure against the pattern, or a decrease of pressure, in other words, so long as the contacts 42—43 remain open. If during this longitudinal movement of the main slide, the tracer, following the pattern, engages a rise or high point, the tracer point will be still further forced laterally and the contact carrying lever 39 will be thrown over far enough to close the contacts 50—51, which, operating through the leads 76—77, will energize the magnet S of the relay 64 and draw the armature 65 over to close the circuit through the leads 72—74 of the magnetic clutch S, in the clutch case 24, and actuate the cross feed lead screw so as to move the cross feed slide and the tool 19 outward in conformity with the shape of the pattern. If the curvature or hump to be passed over by the tracer is greater than can be taken care of by the combined feed of the main lead screw and the cross feed lead screw, additional pressure will be placed upon the contact carrying lever 39 and the auxiliary lever 54 will be forced backward to break the contacts 60—61 which, it will be seen, will break the circuit through the magnetic clutch 10, that at the time is operating the lead screw of the main slide. Breaking the circuit at this point, enables the magnetic clutch S of the cross feed clutch case 24 to withdraw the tracer and tool, in accordance with the pattern, until the excessive pressure is released. In this manner, the contacts will be rapidly made and broken, so as to permit the magnetic clutches to feed the tool and tracer, both of which, as previously pointed out, operate or move in unison, while the tracer follows the pattern and the tool reproduces the outline of the pattern in the work in the turning lathe. It will be obvious that the cut of the tool 19 may be taken from either direction of feed of the lead screw 7, but as here shown, the feed is from right to left and the proper magnetic clutch 10 is brought into action by throwing the switch 84.

While I have described my improved electric tracer control for lathes, in connection with one form of lathe, and the adaptation thereto of one form of tracer control, it will be understood that I do not wish to be limited to the specific construction or arrangement herein shown, for obviously, various modifications may be made in adapting the device to various conditions of operation without departing from the spirit and scope of the invention.

I claim:—

1. In an electric tracer control for lathes, the combination with means for rotating the work to be turned, of a lead screw for moving the main slide longitudinally, a pair of power driven magnetic clutches adapted for rotating said lead screw in one direction or the other, a cross slide mounted on said main slide, a cross feed screw for said cross slide, a pair of magnetic clutches mounted on said main slide and operatively connected to said cross feed screw for moving the cross slide toward or from the work, an electric tracer mounted on said cross slide and adapted to cooperate with a fixed pattern for controlling the toward and from movement of said cross slide by controlling low potential circuits for relays closing high potential circuits, energizing the respective magnetic clutches and means whereby excessive pressure on said tracer is adapted to cut out the operation of the magnetic clutches for operating said main slide by breaking the high potential circuit of the clutch.

2. The electric tracer control for lathes as claimed in claim 1, in which said tracer is adapted to operate contacts in low potential circuits operating relays controlling high potential circuits for operating said magnetic clutches and a manually operated double throw switch is provided in the high potential circuit to the magnetic clutches of said main lead screw, for determining the magnetic clutch to be operated according to the direction of feed of the main slide.

3. The electric tracer control for lathes as claimed in claim 1, in which the magnetic clutches for the cross feed screw are connected to the latter by bevel gears and operatively driven by an electric motor, the clutches and motor having its shaft parallel to said screw being mounted together as a unit on said main slide and movable therewith.

4. In an electric tracer control for lathes, the combination with a main longitudinal slide and a lead screw therefor, of a pair of power driven magnetic clutches adapted to be operatively connected for driving said lead screw in one direction or the other for feeding said longitudinal slide, a cross feed slide mounted on said longitudinal slide, a lead screw for said cross feed slide, a pair of motor driven magnetic clutches mounted on said longitudinal slide and adapted to be connected to said cross feed lead screw for moving a tool on the cross feed slide toward and from the axis of the spindle of the lathe, high potential line circuits for energizing the respective magnetic clutches, low potential local circuits operating relays to control the line circuits of said clutches comprising a single magnet relay for the line circuit to the clutches for the main slide and a two magnet double throw relay for the line circuits to the respective clutches for the cross feed, a double throw switch in the line circuit from said single magnet relay for closing the circuit to one or the other of said clutches for feeding the longitudinal slide, and a tracer mounted on said cross feed slide and adapted to cooperate with a pattern, said tracer being adapted to operate contacts in the low potential circuits to said relays for controlling the feed of the respective slides by controlling the operation of said magnetic clutches.

5. In an electric tracer control for lathes, the combination with a spindle for rotating the work to be turned, of a main lead screw for moving the tool parallel to the axis of the spindle, a pair of power operated magnetic clutches adapted to be operatively connected with said lead screw for turning the latter in one direction or the other, a cross feed slide supporting the tool, a lead screw for moving said cross feed slide and thereby moving the tool toward and from the work, a pair of power driven magnetic clutches operatively connected with said cross feed lead screw for rotating the latter in one direction or the other, an electric tracer mounted upon and movable with said cross feed slide and adapted to cooperate with a relatively fixed pattern, high potential line circuits for energizing said magnetic clutches, a single magnet relay adapted to be controlled by said tracer through a low potential local circuit for controlling the high potential circuit to said clutches for the main lead screw, a switch for placing one or the other of said main lead screw clutches in circuit with said relay, a double relay controlled through low potential circuits from said tracer for controlling the high potential circuit to said cross feed clutches for direct and reverse feed of the cross feed slide, and contacts controlled by said tracer for breaking the line circuit to said main lead screw clutches independently of said relay or switch.

JOHN C. SHAW.